UNITED STATES PATENT OFFICE.

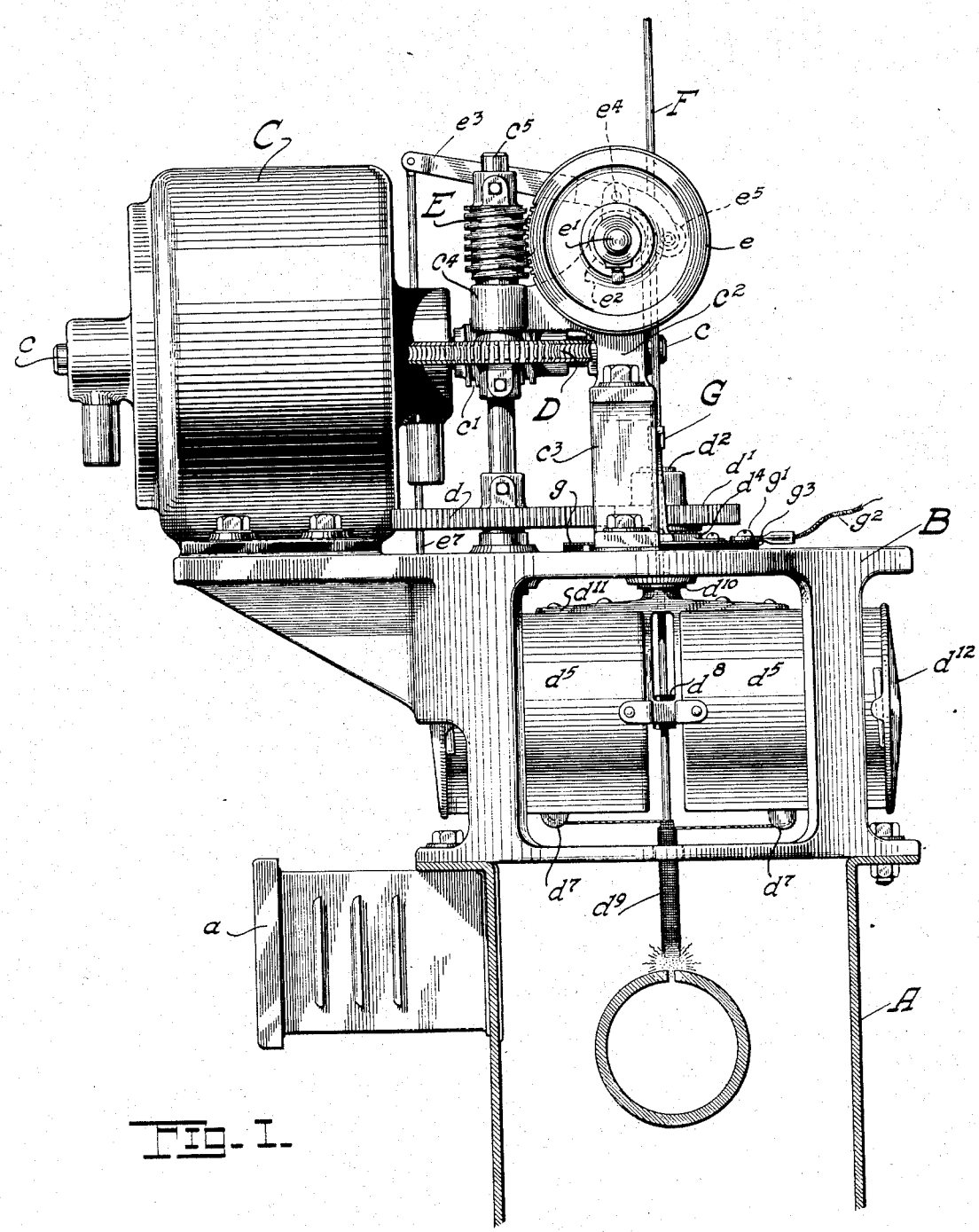
Fig. I.

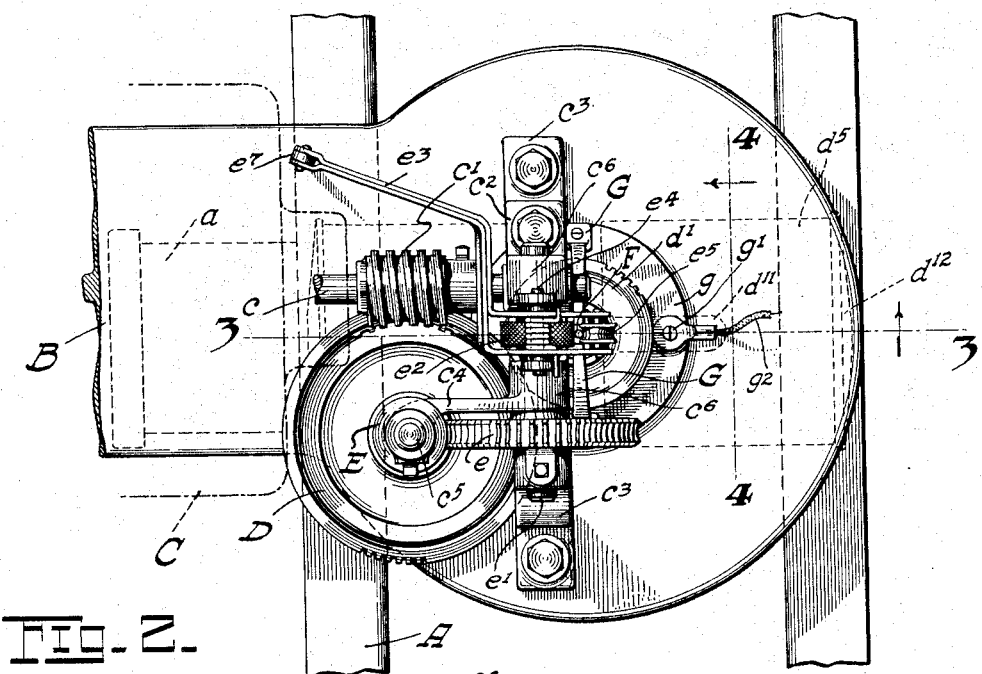
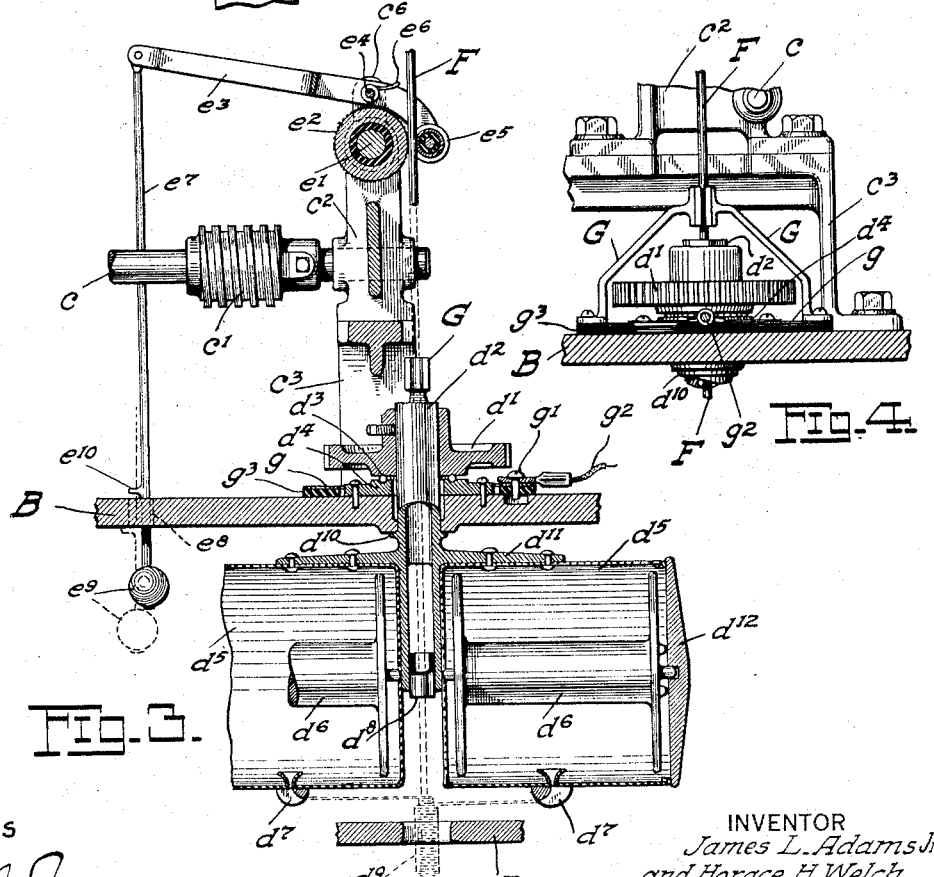

JAMES L. ADAMS, JR., AND HORACE H. WELCH, OF MILWAUKEE, WISCONSIN, ASSIGNORS TO A. O. SMITH CORPORATION, OF MILWAUKEE, WISCONSIN, A CORPORATION OF NEW YORK.

ELECTRIC-ARC-WELDING MACHINE.

1,343,607. Specification of Letters Patent. Patented June 15, 1920.

Application filed November 10, 1919. Serial No. 336,936.

*To all whom it may concern:*

Be it known that we, JAMES L. ADAMS, Jr., and HORACE H. WELCH, citizens of the United States, and residing in the city of Milwaukee, county of Milwaukee, and State of Wisconsin, have invented certain new and useful Improvements in Electric-Arc-Welding Machines; and we do declare that the following is a full, clear, and exact description thereof, such as will enable persons skilled in the art to which the invention pertains to make and use the same, reference being had to the drawings hereto attached and forming part of our specification for disclosure as to the details of construction and explanation of the mode of operation.

Our invention relates to electric welding machines provided with devices for covering a fusible metallic electrode as the welding operation proceeds.

Our invention resides in an arc welding machine in which a continuous electrode of destructible variety is employed. In the present instance such electrode is formed as a single straight wire of extreme length, or it may be formed as a wire of indefinite length, which latter may be coiled upon a reel supported above the machine, or at some other convenient point. The electrode is fed into the machine in a ratio determined by the consumption thereof in the welding operation.

Covered electrodes of short sections or lengths have heretofore been used in welding, but inasmuch as such short sections have been rapidly consumed, the ratio of consumption of the electrode being approximately equal to the length of the welding line of the particular work, it has been necessary to stop the operation of the welding machine at frequent intervals and upon completion of a welded joint of given length, in order that another section of electrode might be placed in position. It is also old to use fusible electrodes of continuous length, but electrodes of this latter class have not been generally covered. Certain advantages are established as inherent to the use of covered electrodes, as is well known to those conversant with the art of electric arc welding in its present development.

The welding machine embodying the present invention has been designed so as to have capability for continuously feeding the electrode to the work; and the machine also embodies devices which act progressively to apply a covering to the electrode as the latter is advanced to the welding point. These covering devices are so constructed and operated that a cord or cords of proper material which has been previously treated with a heat resisting chemical compound will be applied to the electrode in the ratio of the consumption of the latter.

The covering cords are laid about the electrode by means of a rotating flier mechanism, carrying bobbins of considerable capacity, so that sufficient winding material may be in reserve. This feature enables a great length of electrode to be covered and consumed before the necessity for replenishment of the bobbins arises. The electrode feeding devices and the means for applying the covering material are connected so as to operate synchronously. The invention also includes means for effecting a contact between the uncovered portion of the electrode and the source of the electric current, which contact is maintained during the passage of the electrode through the welding machine.

We claim as our invention, also, the improved method of electric welding, in which a fusible metallic electrode supplied with a welding current is covered during the feeding and fusing operations.

In the accompanying drawings, Figure 1 is a right hand sectional view through the chamber of an arc welding machine, showing our improvement as mounted thereon.

Fig. 2 is a plan view of the latter, the motor shown in Fig. 1 being omitted;

Fig. 3 is a vertical sectional view on the line 3—3 of Fig. 2, looking through the right of the machine; and Fig. 4 is a vertical sectional view on the line 4—4, Fig. 2, showing the means for securing and preserving contact with the electrode as the latter is fed through the welding machine.

In the drawings, the upper part of the welding chamber of an arc welding machine is indicated by A, the hood $a$ thereof being provided with a colored glass screen through which the operation may be inspected. A frame B is mounted in fixed position over the welding chamber, and a motor C is fixed upon the frame at the front thereof. The shaft $c$ of the motor, carrying a worm $c'$, is journaled at $c^2$, in a standard $c^3$, upon the frame B. An arm $c^4$ of the said standard is provided with a bearing for the vertical shaft $c^5$, the lower end of which is stepped into a bearing formed in the frame B.

A worm gear D fixed upon the shaft $c^5$ is driven by the worm $c'$. At its lower end the shaft $c^5$ carries a gear $d$ which meshes with and drives a smaller gear $d'$ mounted upon the upper end of a tubular shaft $d^2$ having its bearings in the upper part of the frame B. An anti friction ball race $d^3$ is interposed between the lower face of the gear $d'$ and a ring $d^4$ attached to the frame, and forming a part of the bearing for the said tubular shaft $d^2$. An annular flange $d^{10}$, is formed upon the tubular shaft, such flange bearing upon the under side of the frame B. The gear $d'$ is set in adjusted position on the tubular shaft, so that longitudinal play of the said shaft is prevented.

Near its upper end the vertical shaft $c^5$ carries a worm E, which meshes with and drives a worm gear $e$ fixed to a short shaft $e'$ journaled in the forked upper ends $c^6$ of the standard $c^3$. A knurled feeding roller $e^2$ is secured upon the shaft $e'$, between the forks of the standard, but is insulated therefrom. A tension lever $e^3$ is pivoted upon a pin $e^4$, mounted in the forks of the standard above the knurled feeding roller $e^2$. At its rear end, and coöperating with the feeding roller $e^2$, a grooved pressure roller $e^5$ is mounted upon the tension lever $e^3$. A spring $e^6$, coiled about the pin $e^4$, and bearing upon the tension lever $e^3$, serves to draw the grooved roller $e^5$ toward the knurled feeding roller $e^2$.

The electrode, which will be formed of wire of a material suitable to the work to be welded, is drawn from its source of supply (not shown), and is passed between the rollers $e^2$ and $e^5$. The pressure of the latter roller serves to hold the said electrode in engagement with the surface of the knurled roller $e^2$, whereby upon positive rotation of the latter, the said electrode will be fed into the machine as the welding operation progresses. A link $e^7$ is connected to the free forward end of the tension lever $e^3$. The said link is passed through a slot $e^8$ in the frame B, and is provided with a weight $e^9$ at its lower end, which weight will be sufficient to overcome the stress of the spring $e^6$, and separate the rollers $e^2$ and $e^5$. However, to maintain the frictional engagement of the said rollers with the electrode as the latter is passed therebetween, the link $e^7$ is provided with a projection $e^{10}$, which is adapted to rest upon and engage the upper surface of the frame B, to neutralize the effect of the weight $e^9$, when a lifting pressure is exerted upon the rod $e^7$.

At its lower end and beneath the bearing thereof, the tubular shaft $d^2$ is provided with oppositely extending wing pieces $d^{11}$ so as to form a flier. Upon the latter are mounted two casings $d^5$, each of which is adapted to receive a bobbin $d^6$, upon which will be wound a supply of the cord $d^9$ intended to be used as a covering for the electrode. The journals of the bobbin are set in the bottom of the casing, and the detachable cover $d^{12}$, thereof. The cord passes from the bobbins through a guide eye $d^7$ provided in each casing, and from the guide eyes to the electrode. It will be understood that when the motor drives the feeding roller $e^2$ through the gearing described, the flier carrying the bobbins will likewise be rotated about the electrode by means of its appropriate connected gearing. The speed at which the motor will be driven will be determined by the character of the work to be welded, and the feeding of the electrode will be in direct ratio to the consumption thereof. The mechanism for laying the cords in place about the electrode will have a synchronous operation with the movement of the electrode so that the electrode will be covered at a rate which is exactly in proportion to the feeding thereof.

The lower end of the tubular shaft $d^2$ is provided with an insulating bushing $d^8$, through which the electrode is guided, and contact of the latter with the metal working parts of the machine is prevented.

In arc welding as practised at the present time, the fusible electrode constitutes one terminal of the electric welding circuit, and the work to be welded the other. The electrode is guarded against contact with any of the metal parts of the apparatus, and this is true even with reference to the reel, not shown, upon which the wire forming the electrode is coiled, and of the devices which support the wires of extreme length, when the latter are used as electrodes. To bring the electrode into the welding circuit, we have provided a pair of brushes G which are mounted upon a metal ring $g$ connected at $g'$ with a feed wire $g^2$, through which the welding current is supplied. The said ring rests upon the upper side of the frame B, but is insulated from contact therewith as at $g^3$.

The capacity of the bobbins will be such that the cord carried by them will be sufficient to cover a great length of the electrode, before stopping the welding machine for the purpose of replenishing the supply of covering material.

Fig. 1 of the drawings shows conventionally the operation of welding the edges of a plate, which latter has been rolled into the form of a tube.

Having thus described our invention, what we claim and desire to secure by Letters Patent of the United States, is:—

1. In an electric welding machine, devices for feeding a fusible electrode, in combination with means for applying a covering to such electrode as the latter is fed to the work to be welded, and connections supplying electric current to the electrode during such feeding and covering operations.

2. In an electric welding machine, devices for feeding a fusible electrode to the work to be welded, means for applying a covering to such electrode, and connections between said devices and means whereby synchronism of the two operations described is secured.

3. In an electric welding machine, devices for feeding a fusible electrode to the work to be welded in the ratio of the welding operation, in combination with means for applying a covering to such electrode as the latter is fed to the work.

4. In an electric welding machine, devices for feeding a fusible metallic electrode to the work to be welded, a flier provided with a supply of material for covering the electrode, and connected means for rotating the flier to cover the electrode as the latter is fed to the welding line.

5. In an electric welding machine, devices for feeding a fusible electrode to the work to be welded, in combination with a flier, means for rotating the flier to apply the material carried thereby to the electrode, and connections to feed a welding current to the electrode during the feeding and covering operations.

6. In an electric welding machine, devices for feeding a fusible metallic electrode, connections for supplying a welding current thereto, in combination with means for progressively applying a covering to the electrode during the feeding operation and at a point in advance of the fusing point of the electrode.

7. The method of arc welding, which consists in bringing into proximity the edges of the work to be welded, conducting an electric welding current thereto by means of a fusible electrode, feeding such electrode to the work in the ratio of the consumption of the electrode, and applying a covering to the electrode during the feeding and fusion thereof.

8. In an electric welding machine, devices for feeding a fusible electrode to the work to be welded, connections for supplying current to the electrode, a rotary flier and actuating means therefor to apply a covering to the electrode at a point between the said current connections and the fusing end of the electrode, and connections between the feeding devices and the actuating means, whereby the operation of said devices and means is synchronized.

9. In an electric welding machine, devices comprising a driven roller for feeding a fusible electrode to the work to be welded and tension means for engaging the electrode with the driven roller, electrical connections for supplying current to the electrode during the feeding movement thereof, in combination with means for applying a covering to the electrode at a relatively fixed point in the travel of the electrode, and connections between the feeding devices and covering means whereby said devices and means are operated synchronously.

10. In an electric welding machine, a driving shaft, means operated therefrom to feed a fusible electrode to the work to be welded, means for covering the electrode, and connections between the driving shaft and covering means, whereby the latter is operated in the ratio of the feed of the electrode.

11. In an electric welding machine, a driving shaft, means for feeding a fusible electrode, gear connections between the driving shaft and feeding means, whereby the latter is operated to feed the electrode at a rate of speed in fixed ratio to the consumption of the electrode, in combination with means for applying a covering to the electrode, and gear connections between the driving shaft and the covering means, whereby the latter is operated in synchronism with the feeding means.

In testimony whereof we have signed our names at Milwaukee, this 4th day of November, 1919.

JAS. L. ADAMS, Jr.
H. H. WELCH.

Witnesses:
W. F. WOOLARD,
A. R. WOOLFORK, Jr.